US006622127B1

(12) United States Patent
Klots et al.

(10) Patent No.: US 6,622,127 B1
(45) Date of Patent: Sep. 16, 2003

(54) ORDER ALLOCATION TO SELECT FROM INVENTORY LOCATIONS STOCKING FEW UNITS OF INVENTORY

(75) Inventors: Boris Klots, Belmont, CA (US); William Henry Waddington, Foster City, CA (US); Patricia C. Grewell, San Mateo, CA (US); Peter Ham, Palo Alto, CA (US); Susan L. Griese, Menlo Park, CA (US); Gerry Perham, San Francisco, CA (US)

(73) Assignee: Kaiser Foundation Hospitals, Oakland, CA (US)

( * ) Notice: Subject to any disclaimer, the term of this patent is extended or adjusted under 35 U.S.C. 154(b) by 0 days.

(21) Appl. No.: 09/568,569

(22) Filed: May 10, 2000

Related U.S. Application Data

(60) Provisional application No. 60/133,646, filed on May 11, 1999.

(51) Int. Cl.[7] .............................................. G06F 17/60
(52) U.S. Cl. ......................................... 705/28; 705/22
(58) Field of Search ................... 705/22, 28; 700/216

(56) References Cited

U.S. PATENT DOCUMENTS

| | | | |
|---|---|---|---|
| 3,670,867 A | * 6/1972 | Traube | 198/349.8 |
| 4,656,591 A | 4/1987 | Goldberg | |
| 4,936,738 A | * 6/1990 | Brennan et al. | 414/807 |
| 5,265,006 A | 11/1993 | Asthana | |
| 5,363,310 A | * 11/1994 | Haj-Ali-Ahmadi et al. | 700/216 |
| 5,395,206 A | 3/1995 | Cerny, Jr. | 414/786 |
| 5,666,493 A | 9/1997 | Wojcik et al. | 705/26 |
| 5,768,139 A | 6/1998 | Pippin et al. | |
| 5,880,443 A | * 3/1999 | McDonald et al. | 235/375 |
| 5,910,896 A | 6/1999 | Hahn-Carlson | |
| 5,943,841 A | 8/1999 | Wunscher | 53/154 |
| 6,061,607 A | * 5/2000 | Bradley et al. | 700/216 |
| 6,140,922 A | * 10/2000 | Kakou | 340/568.1 |
| 6,341,269 B1 | * 1/2002 | Dulaney et al. | 705/22 |

FOREIGN PATENT DOCUMENTS

FR 2 696 722 A1 * 9/1992 ................. 414/279

OTHER PUBLICATIONS

Automatic I.D. News, "20/20 results achieved with technology trio", Sep. 1995, p. 19.*
Maloney, David, "The New Corner Drugstore", May 1, 2000, Modern Materials Handling, vol. 55, No. 5, p. 58.*
van den Berg, Jeroen, "A Literature Survey on Planning and Control of Warehousing Systems", Aug. 1999, IIE Transactions vol. 31, No. 8, p. 751.*
Wilson, Joe, "Selecting Warehouse Management Software (WMS) For Food Distribution Operations", Oct. 1998, Frozen Food Digest, vol. 14, No. 1, p. 18.*
Koster, Rene de, "Routing Orderpickers in a Warehouse", May 1998, IIE Transactions, vol. 30, No. 5, p. 469.*

* cited by examiner

*Primary Examiner*—Richard E. Chilcot, Jr.
*Assistant Examiner*—Bryan Jaketic
(74) *Attorney, Agent, or Firm*—Beyer, Weaver & Thomas, LLP

(57) ABSTRACT

A warehouse management system that maximizes throughput and reduces carrying costs by reducing the number of stops that a container makes in the process of fulfilling a customer order. This is accomplished by allocating inventory to orders using the following series of considerations. First, the system selects a pod in order to maximize throughput. If there are multiple locations within the pod that stock the same inventory item, then the method chooses one of those locations based upon the expiration date. Finally, if multiple of these locations have units that expire within the same expiration period, the location with the fewest units is chosen.

30 Claims, 7 Drawing Sheets

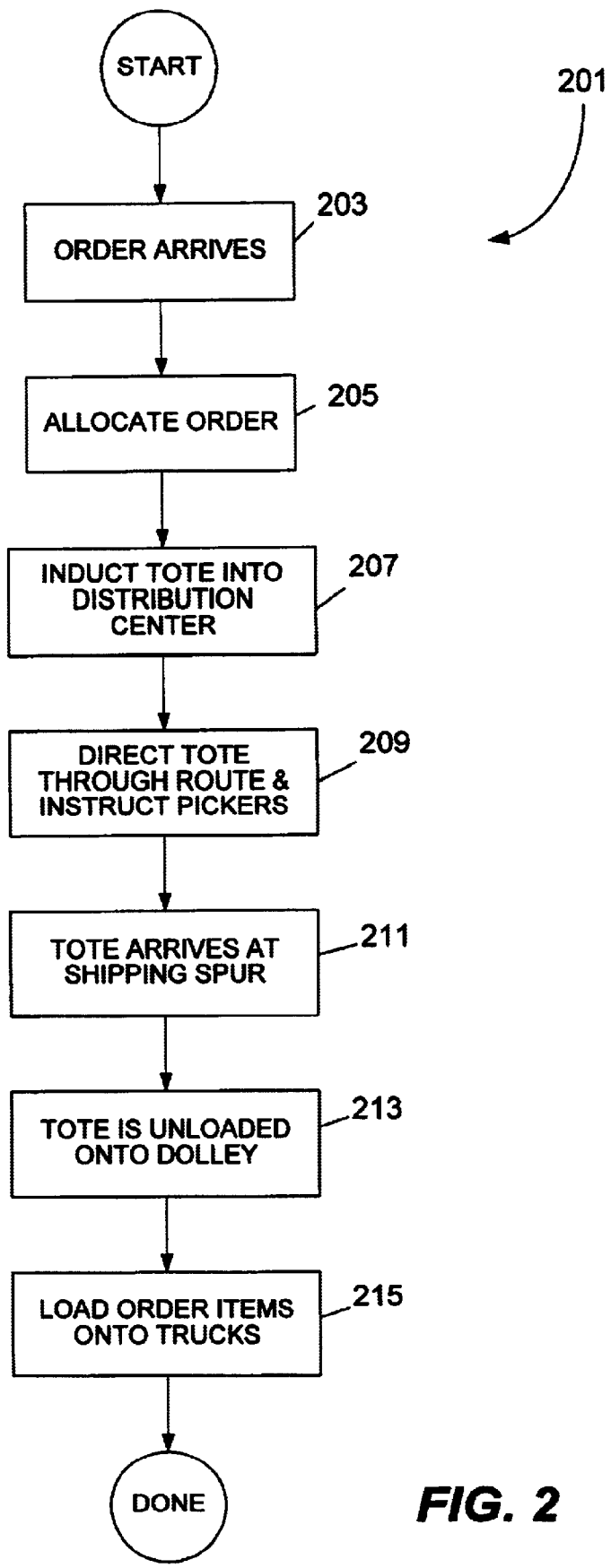

ORDER ALLOCATION TO SELECT FROM INVENTORY LOCATIONS STOCKING FEW UNITS OF INVENTORY

CROSS-REFERENCE TO RELATED APPLICATIONS

This application claims priority under 35 U.S.C. 119(e) from U.S. Provisional Patent Application No. 60/133,646 filed on May 11, 1999, naming L. Borders, G. Dahl, et al. as inventors and titled "ELECTRONIC COMMERCE ENABLED DELIVERY SYSTEM AND METHOD." That application is incorporated herein by reference for all purposes. This application is also related to the following patent applications: U.S. patent application Ser. No. 09/568,603 titled "INTEGRATED SYSTEM FOR ORDERING, FULFILLMENT, AND DELIVERY OF CONSUMER PRODUCTS USING A DATA NETWORK," naming Borders et al. as inventors, U.S. patent application Ser. No. 09/568,570 titled "INVENTORY REPLICATION BASED UPON ORDER FULFILLMENT RATES," naming Klots et al. as inventors, and U.S. patent application Ser. No. 09/568,571 titled "ORDER ALLOCATION TO MINIMIZE CONTAINER STOPS IN A DISTRIBUTION CENTER," naming Waddington et al. as inventors, all filed on the same day as the instant application. Each of the above-referenced U.S. Patent Applications is incorporated herein by reference for all purposes.

BACKGROUND OF THE INVENTION

This invention pertains to fulfilling customer orders from inventory that has already been stocked within a distribution center. More specifically, this invention pertains to fulfilling order lines by choosing order items from inventory locations holding relatively few units of the items.

Distribution centers are buildings or regions where inventory is stored and used to fulfill orders for customers. Customers place orders by various modes such as by telephone, mail, Internet browsers, and the like. To run a distribution center economically, at least three overarching concerns must be addressed: (1) minimizing carrying costs per unit of inventory, (2) minimizing spoilage, and (3) maximizing throughput.

Carrying costs may be viewed as the "overhead" associated with each unit of inventory that moves through the distribution center. Such overhead includes the cost of real estate, the cost of special ambiences such as refrigeration, etc. To minimize carrying costs per unit of inventory, the distribution center should maximize the productive use of its space. To the extent possible, all inventory locations should be fully stocked with rapidly moving items. Obviously, some items in the distribution center move much faster than other items. In order to attract customers, an organiization's distribution center must stock a wide variety of items, including those that move fast as well as those that do not move so fast. Ideally, inventory locations are correctly biased in favor of rapidly moving items.

A distribution center's "throughput" is defined as the volume of inventory or number of orders fulfilled in a given unit of time. At least two parameters feature prominently in maximizing throughput: (a) useable inventory and (b) load balancing during order fulfillment. Usable inventory simply refers to the amount of inventory that is immediately available for order fulfillment. Obviously, if a distribution center has insufficient inventory to immediately fulfill all its orders, that distribution center cannot realize its potentially highest throughput. Load balancing refers to consistently using all order fulfillment mechanisms available for fulfilling orders. If any of these mechanisms sit idle, throughput drops off rapidly.

A given distribution center may have many order fulfillment mechanisms. In one example, the distribution center includes a conveyor that transports a container to various locations, each of which has an order fulfillment mechanism. One location may have a bank of carousels, each containing numerous bins that stock inventory. Each bin holds one or more types of inventory. When a container arrives at a carousel, it rotates its inventory into a position where order items can be placed in the container. Another order fulfillment mechanism in the distribution center may have a few aisles each containing multiple bins. A worker moves through the aisles to pick out requested items and place them in the container. Other types of order fulfillment mechanisms may be employed. A "pod" is a group of inventory locations all serviced from the same stop on the transport system (e.g., a conveyor stop). A pod may contain any or more of the various types of order fulfillment mechanism. Each pod has one or more types of inventory available for "picking." Picking refers to the operation of retrieving an item of inventory from a pod and placing it into a container. The container holds the various items that fulfill a given order.

Given that different customers have very different needs and preferences, different orders provide wide and rather unpredictable variation. Optimal load balancing to meet this variation presents a serious challenge. During a given week, for example, several grocery orders may require milk, but only a few of these require anchovies, a few others require spicy tofu, and still a few others require cotton swabs. Rapidly fulfilling all such orders in a manner that reduces carrying costs per unit inventory presents a special challenge.

The present invention fills a need for better ways to fulfill customer orders within a distribution center.

SUMMARY OF THE INVENTION

This invention provides a method and associated warehouse management system that maximizes throughput and reduces carrying costs by reducing the number of stops that a container makes in the process of fulfilling a customer order. This is accomplished by allocating inventory to orders using the following series of considerations. First, the system selects a pod in order to maximize throughput. If there are multiple locations within the pod that stock the same inventory item, then the method chooses one of those locations based upon the expiration date. Finally, if a subset of these locations have units that expire within the same expiration period (the soonest expiration period), the method chooses the location with the fewest units. In this manner, those inventory locations having the most idle space are rapidly cleared to make more complete use of the available space.

One aspect of this invention provides a method of filling a customer order in a distribution center having a plurality of pods. Each pod has multiple inventory locations for stocking a plurality of items. The method may be characterized by the following sequence: (a) choosing at least one pod based upon a throughput analysis to provide items necessary to fulfill the customer order; (b) identifying a replicated item from the customer order; and (c) choosing to fill the customer order with units of the replicated item stocked in a second inventory location. In this aspect, the replicated item is stocked in at least two inventory locations in the first pod: a first inventory location having a first number of units of the replicated item and a second inventory location having a second number of units of the replicated item. The first number of units is greater than the second number of units. Thus, the method chooses items from the location having the smaller number of stocked units.

Preferably, the throughput analysis of (a) analyzes at least one of the following parameters: (i) a number of pods that a container must stop at when receiving items to fill the customer order and (ii) balancing pick loads of various pods within the distribution center. Regarding the number of pods that the container must stop at, the method should choose pods that contain large numbers of items from the order so that many order items can be placed in the container in a single stop. With this in mind, the first pod should be chosen because it contains, in comparison to other pods in the distribution center, the most items of the customer order.

In some cases, the expiration time (date) of an item may override the unit count in a location. To this end, the method may also identify an expiry item from the customer order, which expiry item is replicated in an early storage location within the first pod and a later storage location within the first pod. Units of the expiry item in the early storage location expires sooner than units of the expiry item in the later storage location. In this scenario, the method chooses to fill the customer order with expiry item units from the first storage location. Not always will the method choose the earlier expiring units. It may first determine that the expiration point of the units in the early storage location is not earlier than a cutoff time (e.g., the item will expire within 2 days or less after delivery to the customer), after which the units cannot be used to fulfill the customer order. When the expiration time of units of a replicated item from two or more locations fall within the same "expiration window" (say within 1 to 3 days of one another), then the method chooses the location stocking the fewest units.

Another aspect of the invention pertains to a distribution center having inventory arranged for filling customer orders. The distribution center may be characterized by the following features: (a) at least one ambient having a plurality of pods; and (b) a warehouse management system. The warehouse management system performs at least two operations. First, it conducts a throughput analysis to select a first pod to provide at least some of the items necessary to fill a customer order. Second, it selects replicated items stocked in at least two inventory locations in the first pod based upon which of the two inventory locations has the fewer units of the replicated item. The warehouse management system may also include logic for identifying an expiry item from the customer order, and filling the customer order with units of such item that have an earlier expiration date. Often the warehouse management system will also include a database of inventory that specifies inventory locations for each of the items stocked in the distribution center.

Typically, the distribution center will include some form of transport system such as a conveyor that moves a container from pod to pod and stops the container at pods where items are picked from the pod and placed in the container to fill the customer order.

Often the distribution center will have a plurality of ambiences, each with its own collection of pods. In such cases, the customer order is divided into at least a first group of items stocked in a first ambient and a second group of items stocked in a second ambient. The above-described method, as implemented by the warehouse management system, is performed on the first group of items in the first ambient and separately performed on the second group of items in the second ambient. Examples of typical ambients include room temperature ambients, refrigerated ambients, humidors, and freezers.

These and other features and advantages of the present invention will be described in more detail below with reference to the associated figures.

BRIEF DESCRIPTION OF THE DRAWINGS

FIG. 2 is a flow chart depicting a high level start-to-finish order fulfillment method that may be used in a distribution center implementing the present invention.

DETAILED DESCRIPTION OF THE PREFERRED EMBODIMENTS

Figure 1A:
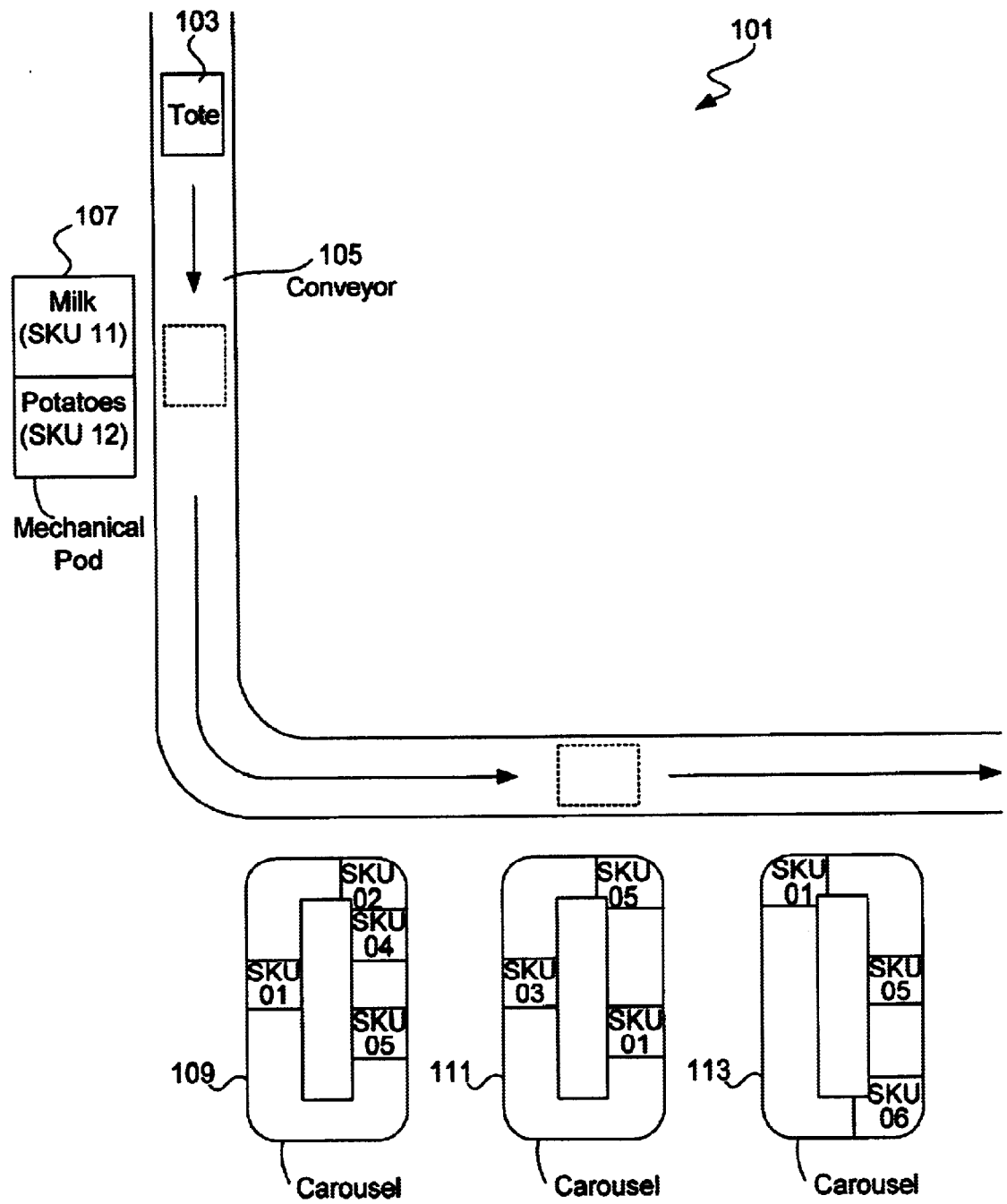
FIG. 1A is a block diagram of a distribution center in which inventory is placed based upon how rapidly it is consumed.

The following discussion presents some terms and concepts pertinent to the operation of a distribution center. The invention is not specifically limited to the examples described hereafter.

Totes are storage containers used to hold products for transportation to the consumer. There may be several different sizes of totes. Additionally, some totes may be designed for holding frozen and refrigerated goods. In some embodiments, the totes are relatively sturdy and have closable lids.

Each tote may have an identifier to support automated movement through the distribution center by a conveyor or other transport mechanism (e.g., a hand truck or cart). The identifier may be a bar code identifier that can be scanned as it moves past various points in the system. In this manner, a tote can be moved from a tote induction area to a specific pod or other location with the system tracking the location of the tote.

As indicated, the distribution center has a transport system such as a conveyor that moves totes and trays to pods and other locations within distribution center. "Trays" are used to transport new inventory from a receiving station in the distribution center to individual pods within the distribution center. Identifiers on the trays allow them to be automatically routed to specific destinations within the distribution center. In a specific embodiment, conveyors from Buschmann Company, Cincinnati, Ohio, are used. In another specific embodiment, software from SeayCo Integrators, Conyers, Ga. automates conveyor movement.

Generally, a pod is a collection of storage areas (inventory locations or bins) within a distribution center. As mentioned, a single distribution center may have several types of pods. Each of the different pods and pod types may be adapted for different temperatures, e.g., frozen goods mechanized pod. The different pods and pod types may also be adapted for the rate of product movement, e.g., mechanized pods for fast moving items.

Carousel pods include one or more carousels adjacent to one or more conveyors. In a specific embodiment, each pod has three carousels adjacent to two conveyors for incoming trays and totes. In some embodiments, two additional conveyors are provided: an express conveyor and an empty conveyor. The express conveyor is used to transport totes directly from the carousel pod to the outbound distribution point for totes. The empty conveyor is used to transport empty trays back to the receiving area to receive new incoming products.

Generally, a carousel is a rotating high capacity storage area. Due to the rotating design of the carousels, only items stored in a small section of the carousel can be easily accessed at a given time. This trade-off allows the carousels to store large numbers of items at the expense of rapid access. One suitable carousel for use with this invention is available from Diamond Phoenix, Lewiston, Me.

Mechanized pods, or mechanical pods, are areas designed to hold the faster moving, and also bulkier and heavier, products for easy access. Each mechanized pod may have inbound and outbound conveyors. Received products may be placed directly into the mechanical pod for storing. Because the mechanical pod items may also be bulkier and heavier than other products, totes that include mechanical pod items may be sent to the mechanical pod prior to the other pods.

Manual pods are areas where "fill to order" items such as produce, bulk foods, pharmacy prescriptions, and/or prepared meals may be prepared and/or stored. The products in the manual pods are typically placed in totes last. Products in manual pods are customer specific preparations. Items are brought from fill to order preparation areas to the manual pods for placement (pick tasks) into totes.

A "pick task" is the retrieval of a product, or multiple quantities of the same product, to fill an order. Thus, an order for ten different products would be comprised of ten pick tasks. However, if the order included five bags of Brand X potato chips, that might be consolidated into a single pick task—depending on the number of bags of potato chips in the pod. For example, if pod two had only two bags of potato chips left and pod three had the last three bags of potato chips, two pick tasks would be required.

Carousel pick tasks may require the coordination of the conveyors to transport the tote to the appropriate pod with the carousels to bring the appropriate storage tray to an accessible position. The pick task may be scheduled, or generated, prior to the actual physical movement of the product, or products, from a carousel location to a tote. Once the pick task is accomplished, the conveyor may move the tote to the next destination automatically. In some embodiments, a push button signal is employed to allow the pick operator to signal that she/he has placed the product, or products, into the tote. Mechanized pick tasks can be accomplished by using carts to move totes received on the inbound conveyor to the products. The products can then be put into the totes for delivery. Once the necessary items are in the totes, the tote is placed on the outbound conveyors. The process for manual pick tasks may be similar to the mechanized pick task. The tote that arrives on the inbound conveyor is scanned. A list of locations with items for the tote is displayed. An operator retrieves the indicated items from the listed locations and then transfers the tote on the outbound conveyor.

A put-away task is the storage of one or more units of inventory at a storage location in a pod. The product must be stored in a temperature appropriate pod. For example, dairy products must be stored at certain temperatures to avoid spoilage. In addition, depending on the type of product, one of the different types of pods will be selected.

The carousels are used to store items in trays. Once the products have been placed in trays, they can either be sent by conveyor for direct put away in the carousels or held on flow racks for later put away. The scheduling of the put away can be based on product shipments, available inventory, load, and other options.

Once the tray is received by conveyor at the carousel pod, audible and/or visual annunciators may indicate the storage location for the tray. The carousel movements are coordinated with the conveyors so that the appropriate storage area of the carousel is available when the tray is to be stored. Weight planning can be used so that heavier trays are stored at or below waist level while lighter trays are stored at or above waist level in the carousel.

FIG. 1A presents a highly simplified depiction of a distribution center 101. In this figure, a tote 103 is introduced into a tote path in the distribution center and moves about on a conveyor 105. It may stop at various pods as it moves throughout distribution center 101. At each pod, a human being, a robot, or a specialized mechanical device picks items from the pod and places them into the tote 103. At the end of the process, tote 103 is filled with items that are used to fill an order. A given order may require one or more totes filled with ordered items. If more than one tote is required because, for example, the customer order does not physically fit into a container, the order is preferably separated in a manner that keeps all items from one pod stop in the same container if possible. This will minimize the total number of stops made by all containers for the order/ambience.

In the example depicted in FIG. 1A, there are two types of pods: a mechanical pod 107 and carousels 109, 111, and 113. Various items, each representing a distinct inventory type, are provided in bins or other portions of the pods. Thus, each pod may contain numerous inventory types. Often these inventory types are referred to as SKUs (Stock Keeping Units). In carousels 109, 111, and 113, items are provided in particular bins, which are rotated into position next to conveyor 105 to facilitate picking. In the example depicted in FIG. 1A, carousel 109 has rotated into a temporary position with the items of SKU 02 available for picking. Likewise, carousel 111 has items from SKU 05 available for picking and carousel 113 has items from SKU 01 available for picking. Typically, when tote 103 stops at a conveyor position, it remains at that location until all items available at the proximate pod are picked and put into the tote (assuming that those items are necessary to fill an order associated with tote 103).

As mentioned, each different item of inventory is associated with a respective SKU. For reference, a "product" is a grouping of SKUs. Product information is higher level information that is pertinent to all SKUs in the grouping. It often defines a brand. A "category" is an even higher level classification based on how customers would expect products to be logically grouped. For example, the category "potato chips" may include the products "Brand X" potato chips and "Brand Y" potato chips. Further, the Brand X potato chip products may include a 16-ounce Brand X potato chips item (associated with a first SKU) and a 20-ounce Brand X potato chips item (associated with a second SKU).

While FIG. 1A shows a distribution center having only one area that contains all the pods, a typical distribution center may have multiple zones or ambiences which dictate special storage or handling. For example, a distribution center may have three main temperature zones for products: ambient, refrigerated, and frozen. And within these three zones, there may be specific ambiences for specialty items, e.g., for flowers, cigars, wines, and chocolates. Wines and cigars can be stocked ambiences having specific temperature and humidity controls. Other items may be deemed fragile and therefore stocked or handled separately from other items. Further, a distribution center may have kitchens, bakeries, deli departments, pharmacies, and other facilities to provide certain products.

In one sense, each ambience may be viewed as a separate distribution center within a larger distribution center that has multiple ambiences. To the extent that this discussion refers to a "distribution center" that discussion applies equally to an ambience within a larger distribution center. Thus, each zone or ambience may have its own collection of pods, conveyance mechanisms, computer systems, etc.

Figure 1B:
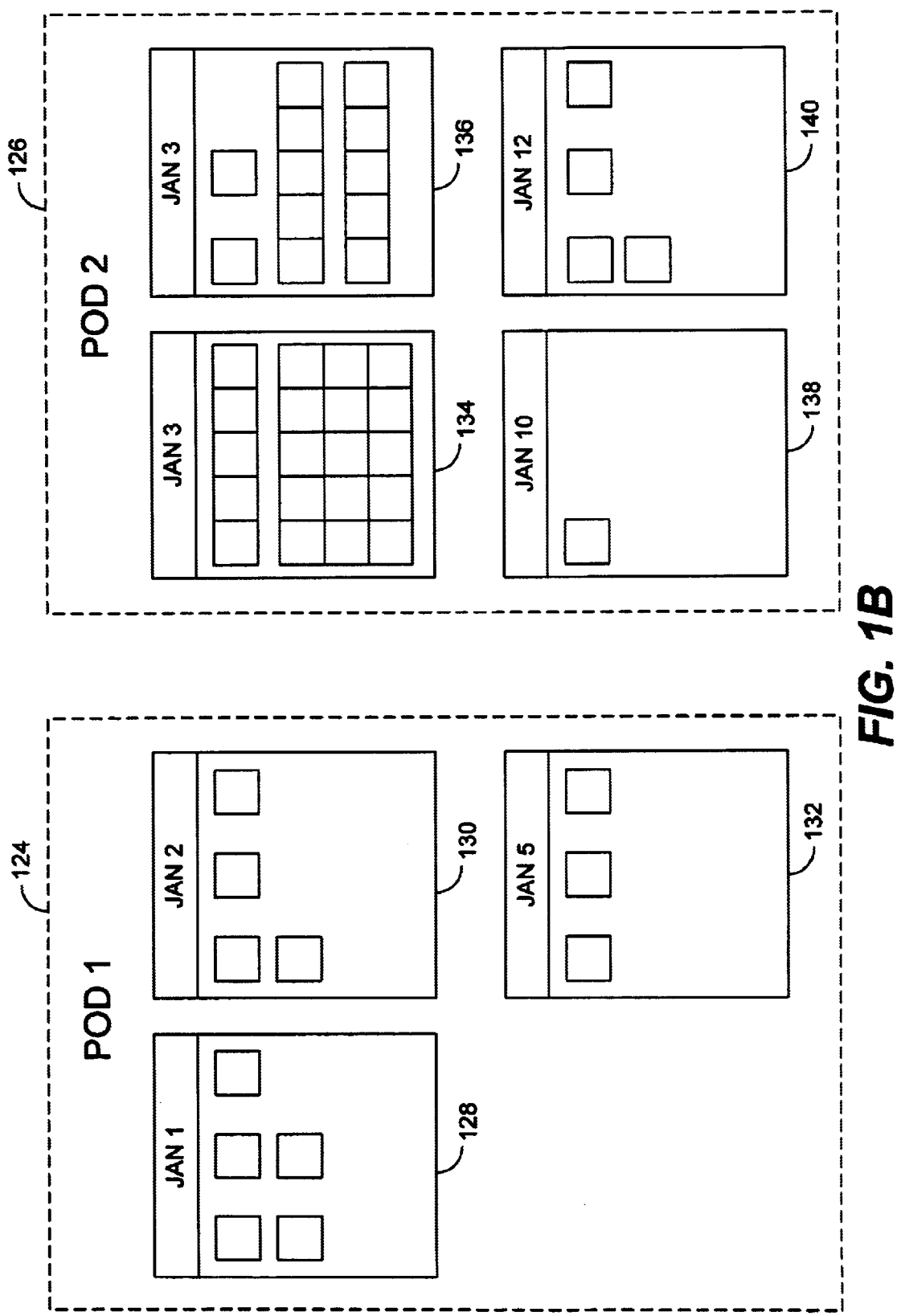
FIG. 1B is a block diagram of two pods stocking expiry items in inventory locations that group units by expiration date.

FIG. 1B presents an example of how the present invention might be implemented to allocate specific inventory units to a customer order. In the block diagram depicted, a distribution center includes a first pod 124 and a second pod 126. The first pod 124 stocks a particular SKU in three separate locations: a location 128, a location 130, and a location 132. Within single one of these inventory locations (e.g., location 130), all units expire on the same day. In this example, all units in location 128 expire on January 1, all units in inventory location 130 expire on January 2, and all units in inventory location 132 expire on January 5. Note also that the individual inventory locations currently stock differing numbers of units. Inventory location 128 currently stocks five units, inventory location 130 currently stocks four units, and inventory location 132 currently stocks only three units.

The second pod 126 stocks the same SKU in four separate inventory locations: a location 134, a location 136, a location 138, and a location 140. Location 134 contains 20 units that expire on January 3. Location 136 contains 12 units that also expire on January 3. Location 138 contains a single unit that expires on January 10. And location 140 has four units that expire on January 12.

An allocation method or system of this invention may allocate units to fulfill a customer order by considering throughput, expiration date, and the number of units in an inventory location. Initially, the pod is chosen based upon throughput considerations. As explained elsewhere herein, such considerations may involve the number of items in a customer order that a pod currently stocks. In this example, assume that the second pod 126 is selected based upon such throughput considerations. For example the customer order may require milk, eggs, orange juice, cheese, and bread, the second pod 126 stocks eggs, cheese, and milk. Within the second pod 126, four separate inventory locations stock an item of interest (e.g., milk). One of these locations will be selected to fulfill the customer order for that particular inventory item.

Normally, the method or system of this invention selects an inventory location that contains the earliest expiring units of inventory. In this case, location 134 and location 136 each contain units that expire on January 3. The units in locations 138 and 140 expire at later dates. Therefore, the method or system should select units from location 134 or location 136.

In this invention, units from location 136 are chosen to fulfill the customer order. This is because location 136 currently stocks fewer units than location 134. In general, this invention will require that selecting locations that stock fewer units to fulfill a customer order—assuming that throughput and expiration considerations are met.

The above approach is subject to certain limitations. For example, a business rule may preclude delivery of units that will expire within a certain time (e.g., three days) from a delivery date. In the above example, it may be that the customer order is scheduled for delivery on January 2. In such case, units from location 136 would not be allocated to the customer order. Most likely, the unit from location 138 would be allocated.

As another limitation, there may be an "expiration window" within which two inventory locations may fall when they house units that expire relatively close in time. For example, the units in location 136 may expire on January 5, while the units in location 134 may expire on January 3. If the expiration window is set to be two days, then the units in location 134 and 136 would be deemed to expire concurrently. Thus, the system would not automatically allocate units from location 134 based upon its early expiration date. Instead, it would allocate units from location 136 because that location contains fewer units.

From the above discussion, it should be apparent that the stocked inventory has certain relevant attributes. These may be represented in database records or specialized data structures, for example. A warehouse management system or other logic may use such attributes to facilitate control and analysis of the distribution center. Obviously, each SKU will have its own product ID. Another important attribute of inventory units is the "pod" in which an inventory item is located. Another important attribute of specific inventory locations is the expiration date of items that expire (e.g., milk, yogurt, bacon, etc.). The expiration of a given item may be defined very specifically in terms of a particular day or time within a day. As indicated in the discussion of FIG. 1B, it may sometimes be more appropriate to define an expiration interval over a period of multiple days. For items that do not expire (e.g., canned goods, pretzels, etc.), it is less critical to ensure that these items are distributed before a particular expiration date. However, it is still important to make sure that the oldest items are cleared out of the distribution center. Therefore, another attribute of non-expiry items is the date that they were received within the distribution center.

Another important attribute of items within a distribution center is the number of units of such item at any given inventory location within the distribution center. Some items may be stored at more than one inventory location in the distribution center, possibly over multiple pods. These various inventory locations may contain different numbers of units of the same inventory item.

As mentioned, at least three concerns must be addressed in allocating customer orders. These are (1) minimizing carrying costs per unit of inventory, (2) minimizing spoilage, and (3) maximizing throughput.

This invention addresses carrying costs by striving to maintain a fully stocked distribution center. It accomplishes this by clearing out those units of inventory in an inventory location that has only a few remaining units. Thus, the invention fills orders in a manner that preferentially selects locations having relatively few items remaining. This means that such locations are rapidly restocked with fresh inventory. As a result, the amount of idle space in the distribution center is minimized.

Regarding minimizing spoilage, a distribution center should stock susceptible items in appropriate ambiences. For example, milk should be refrigerated, cigars should be stored in humidors, and wine should be stored at a temperature of about 55° F. Further, many items have expiration dates. The organization running the distribution center should strive to ensure that very few items spoil on its shelves and that customers receive such items well before their expiration dates.

Generally, maximizing throughput means maximizing the number of picks per unit time. This can be accomplished by tuning at least three parameters: (1) the distribution of loading over the multiple pods of a distribution center, (2) the number of container stops during the course of filling an order, and (3) the location of frequently purchased items.

A well-balanced loading implies that the picks in a distribution center are relatively evenly balanced over its multiple pods. This means that at any given time, all or most of the pods can be engaged in filling orders. As a result, each of the pods can be productively used over most of the course of a day. As described in U.S. patent application Ser. No. 09/568,570, previously incorporated by reference, this state can be approached by intelligently replicating inventory items over multiple pods.

Generally, each additional container stop further lengthens the amount of time required to fill an order. Thus, an order allocation system should allocate order items in a manner that results in the fewest number of pod stops. A general approach to accomplishing this is described below with reference to FIG. 3A and in U.S. patent application Ser. No. 09/568,571, previously incorporated by reference.

Items can be stored at various heights in an aisle, a carousel, or other collection of storage locations in a pod. Typically, a human being picks the items from these storage locations. Certain rules can be formulated to protect workers and increase their efficiency. For example, very heavy items should not be stored at higher storage locations. Fast moving items should be stored in a so-called "golden zone." Items in this zone are stored at about chest height to allow rapid picking.

To put the present invention in a larger context, one suitable order fulfillment process flow will now be depicted with reference to FIG. 2. Understand that various order fulfillment process flows may benefit from the technology of this invention. In FIG. 2, an order fulfillment flow 201 is depicted. Typically, this flow will be controlled and implemented by one or more computer systems associated with a distribution center. The process begins at 203 with an order arriving for fulfillment. Such order may arrive via mail, telephone, the Internet, etc. In a preferred embodiment, the order is provided as a computer readable file in a standard format.

Next, at 205, order allocation takes place. This typically involves matching an order with particular inventory stored in a distribution center and determining where that inventory is located. It may also involve marking inventory within the distribution center as "outbound" under the assumption that such inventory will be picked to fill the order. Still further, the allocation process may determine the number of totes needed to fulfill the order and design the path for each tote to follow while the order is being filled. This path will specify various pods at which the tote stops to have particular items picked to fill the order. Certain aspects of the allocation process will be elaborated on below in the discussion of FIGS. 3A–3C.

After allocation, one or more tote is inducted (207) into the system and begins passing through the distribution center according to its pre-specified path. As it travels through the distribution center, it stops at various pods where a computer system presents instructions for pickers to pick selected items for the order. In a preferred embodiment, pickers place specified order items into the tote, and verify the order item fulfillment by scanning each item placed into the tote, as well as the tote's license plate ID, with a handheld computing device (e.g., RF gun). Alternatively, or for certain pod types such as carousels, the worker pushes a button to verify order fulfillment. After the picker has confirmed placement of the specified items into the designated tote, the tote is then reintroduced to the automated tote transport system, where it continues to travel along its designated tote path. Information about the picked items is fed back to a central computer system which tracks order fulfillment and inventory. The tote is routed through various pod locations until the order is completely filled. See 209. The tote path may be dynamically and automatically altered if problems are detected in any portion of the DC operations.

After all items have been picked and confirmed for a particular tote, the tote is routed to a shipping spur at 211. At this point, the tote contains all inventory items that are required to fulfill its portion of the order. A shipping component of the distribution center can now take over processing the order. At 213, workers or mechanical systems place the tote onto a dolly, which may include other totes intended for a specific delivery route. At 215, workers or mechanical systems load the dollies and totes onto trucks destined for specified locations. The trucks deliver orders to the customers who have placed orders. At this point, the order fulfillment process is completed. The distribution computer system may be notified of a shipment confirmation.

After the order has been fulfilled and processed for shipment, the OFS provides post fulfillment status data relating to the customer order. The post fulfillment status data may include, for example, the number of totes and the physical license plate ID of each tote associated with the customer order, the ID of each shipping dolly used to transport the totes to and from the delivery trucks, and/or the vehicle ID associated with the shipped order. The post fulfillment status data may be relayed to a front office that interfaces with customers.

Figure 3A:
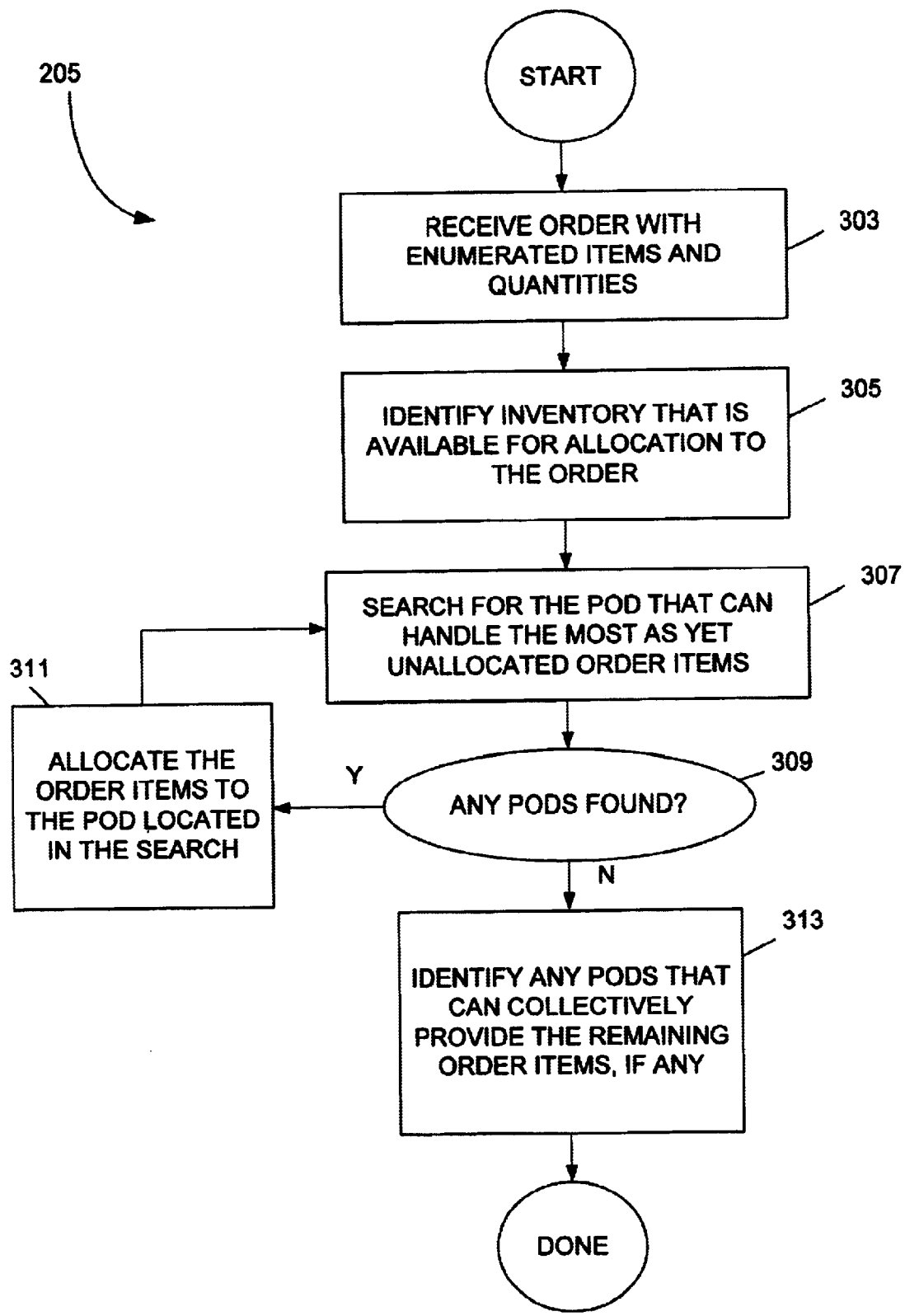
FIG. 3A is a process flow chart depicting a general procedure for allocating customer orders.
Figure 3B:
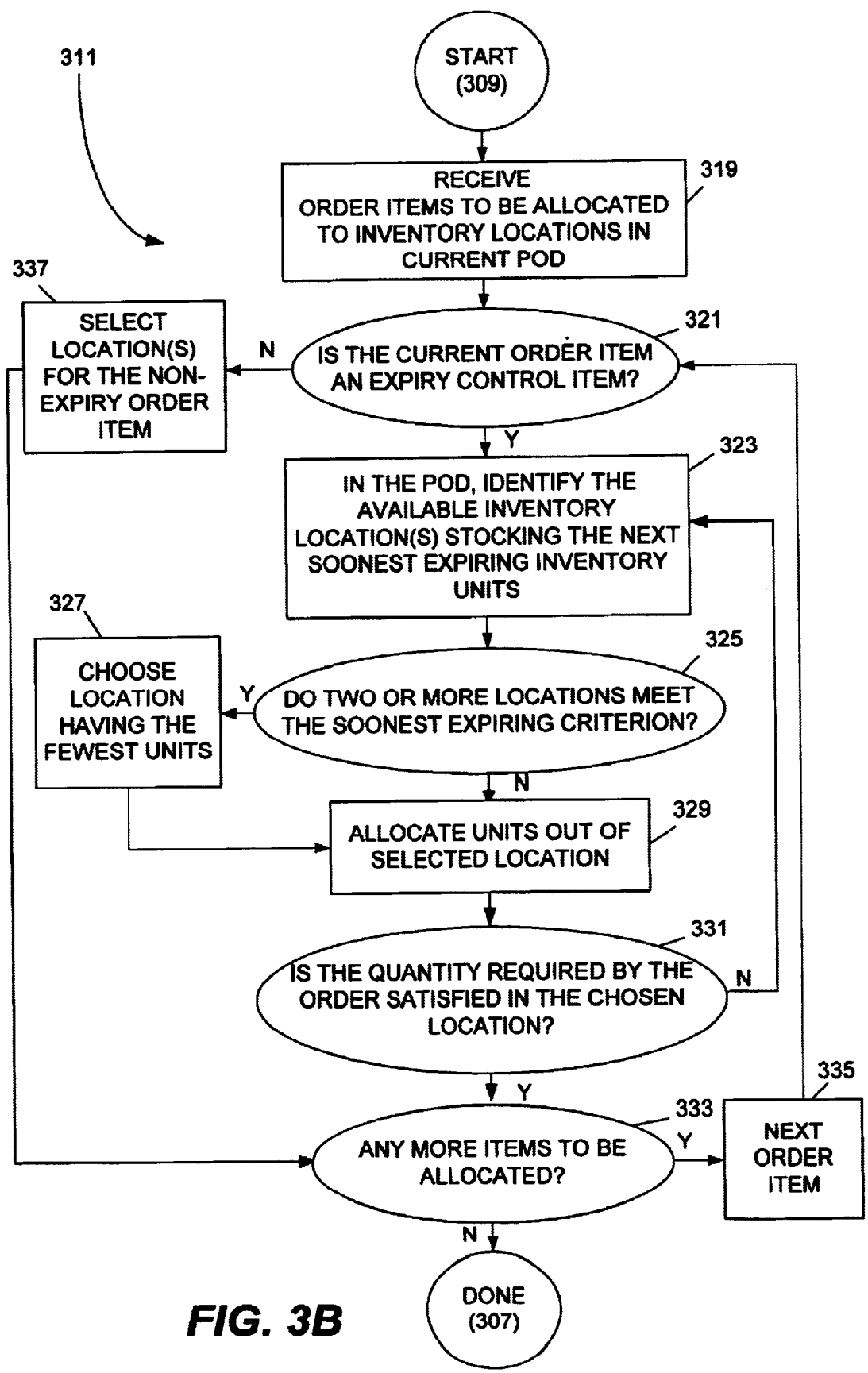
FIG. 3B is a process flow diagram depicting a general procedure for allocating specific order items that are subject to expiration.
Figure 3C:
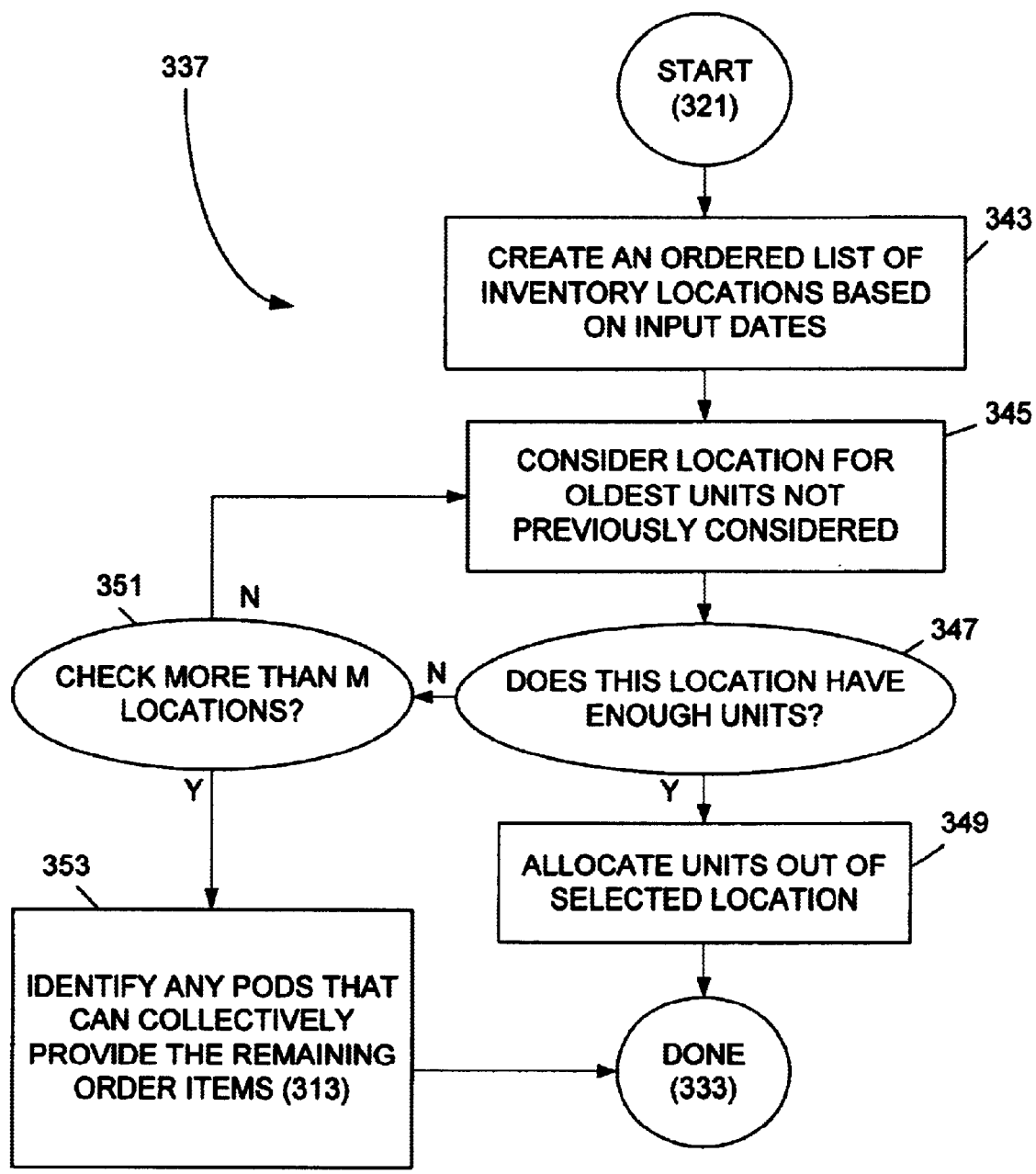
FIG. 3C is a process flow diagram depicting a general procedure for allocating specific order items that are not subject to expiration.

Turning now to FIGS. 3A through 3C, one suitable process for allocating an order in accordance with this invention is depicted. As shown in FIG. 3A, the high level process is depicted by reference number 205, which corresponds to the "allocate order" operation illustrated in FIG. 2.

The order allocation process 205 begins at 303 with the Order Fulfillment Subsystem receiving an order having enumerated items and quantities. Such order may arise in a variety of formats such as a flat file, or a specially formatted data structure. The enumerated items may represent individual SKUs and may be identified by product IDs. The order may also include customer information.

After receipt of the customer order, the Order Fulfillment Subsystem next identifies the inventory within the distribution center that is available for allocation to this particular customer order. See 305. In a preferred embodiment, the distribution center is stocked with inventory that is sometimes replicated. In other words, the inventory is stocked at more than one inventory location within the distribution center. As described in U.S. patent application Ser. No. 09/568,570, replicating inventory in this manner can improve the throughput of the distribution center. In any event, the Order Fulfillment Subsystem preferably identifies all available inventory that can be used to fulfill the order in question.

After such inventory has been identified, the Order fulfillment Subsystem searches for the particular pod within the distribution center that can handle the most items from the customer order. See 307. Because one of the goals of this invention is to ensure high throughput, the Order Fulfillment Subsystem attempts to design a tote path that requires the fewest number of stops. By identifying a pod that can supply many of the order items, the system begins the process of reducing the number of tote stops.

After the search depicted at 307 concludes, the Order Fulfillment Subsystem determines whether any pods are found that can handle at least one item from the customer order. See 309. Typically this will be the case, at least during the first pass through process 205. It may occur in later passes (note that process 205 includes a loop containing operations 307, 309, and 311) that no pods are found having an inventory location with enough units to fulfill an order line.

In any event, assuming that a pod is found at 309 as a result of the search conducted at 307, the Order Fulfillment Subsystem allocates all the order items to the pod located in the search, so long as those items are actually stocked with the pod. See 311. As described in more detail below with reference to FIG. 3B, this allocation process designates specific inventory from specific locations and generates picking tasks for picking the inventory from such locations.

Now, after the specific items stocked within the pod of interest have been allocated, they no longer need to be considered. The process of allocating the remaining order items is handled by looping back to 307 where the Order Fulfillment Subsystem searches for the pod that can handle the most as yet unallocated order items. In a desired scenario, a second pod within the distribution center will stock a number of the remaining unallocated order items. Assuming this is the case, the system will determine that the appropriate pod was found at 309, on the second pass through the system.

The process continues in this manner, looping through operations 307, 309, and 311, until, hopefully, no further order items remain in the customer order at issue. At that point, no pods will be found at 309 (because there are no additional order lines to process). When this is the case, the order allocation process is effectively completed.

Note, however, that in some cases order items may remain, for which no pods can be found to fully satisfy the order. This may occur when, for example, no single inventory location within the distribution center contains a sufficient quantity of the inventory required to satisfy a particular order line. It may be that a sufficient quantity of such item is available within the distribution center collectively over two or more inventory locations in different pods. To address the situation, the order allocation process 205 identifies any pods that can collectively provide the remaining order items. See 313 on the negative path from decision 309. Units of inventory from these pods then can be allocated to fulfill the customer order.

One example of a specific process for allocating order items to a pod is depicted in FIG. 3B. This general process corresponds to operation 311 depicted in FIG. 3A. The goal here is to reserve specific items of inventory from specific inventory locations within a selected pod.

As shown in FIG. 3B, process 311 begins at 319 with the Order Fulfillment Subsystem receiving order items to be allocated to specific inventory locations in the current pod. Next, the Order Fulfillment Subsystem determines whether the current order item is an expiry control item at 321. As indicated, expiry control items are those which have a defined expiration point, typically defined by an expiration date. Examples include milk and most dairy products, produce, meats, etc.

Assuming that the current order item is an expiry control item, the OFS next identifies an available inventory location within the pod that stocks the earliest expiring inventory units. Thus, for example, a pod having two inventory locations stocking Mother Earth brand non-fat milk in one gallon containers would be analyzed by the OFS to determined which of these locations contains the sooner expiring milk. Intuitively, one would expect that the system would always select the earliest expiring inventory to fulfill a current order. In the process of this invention, as depicted in FIG. 3B, however, additional considerations apply.

For example, it is possible that two or more locations within the pod meet this soonest expiring criterion. The Order Fulfillment Subsystem determines whether this is the case at 325. If so, the Order Fulfillment Subsystem chooses the location having the fewest units. See 327. This is done to quickly clear out stock locations that have only a few units of inventory. As such, this algorithm helps make the most of the distribution center's carrying costs. Note, however, that choosing an inventory location having the fewest units can be counter intuitive. Very often, customer orders require multiple units of a particular item (e.g., two six-packs of Coke). By enforcing this algorithm, some times a single location will not supply the entire quantity required by a customer order line.

In any event, after choosing the inventory location at 327, the order fulfillment subsystem next allocates the required order units out of the selected location. See 329. Then the subsystem determines whether the quantity required by the order is satisfied in the chosen location. See 331. If so, process control moves to 333 (described below). If not, the process loops back to 323 where the OFS identifies available inventory locations stocking the "next soonest" expiring inventory units. The process then proceeds to decision 325 as described above (only this time, later expiring inventory units are considered). If two locations contain units meeting the same soonest expiring criteria (e.g., units in both locations expire on the same day), but the chosen location does not have enough units to satisfy the order, then the location having the "next soonest expiring inventor units" identified at 323 is a location having the same expiration window as the previous location. Note that when the OFS determines that only a single location meets the soonest expiring criterion (decision 325 is answered in the negative), process control proceeds directly to allocation operation 329.

After determining that the quantity required by the order is satisfied at 331, the OFS next determines whether any more items remain to be allocated from the current pod. See decision 333. If so, the next order item is considered at 335 and the process loops back to decision 321 where the OFS determines whether this next order item is an expiry control item. When there are no more items to be allocated within the pod under consideration, the process finishes.

Note that when the current order item is not an expiry control item (e.g., decision 321 is answered in the negative), process control moves to 337 where the OFS selects one or more locations for the non-expiry order item. This process is depicted in further detail in FIG. 3C. As shown there, process 337 begins at 343 with the OFS creating an ordered list of inventory locations for the order item under consideration. The ordered list is sorted based on input dates. Thus, for example, a carton of soup arriving at the distribution center in January of a particular year would be sorted above an identical carton of soup arriving at the distribution center in March of the same year.

After creating such ordered list, the OFS next considers the location of the oldest units in the list. See 345. It then determines whether this location has enough units to satisfy the customer order line. See decision 347. If so, it simply allocates the units from the selected location at 349 and the process is then complete for that order item. However, if the location of interest does not have enough units, the OFS may consider the next oldest units in the ordered list. In the algorithm depicted in FIG. 3C, the OFS will do this for a fixed number (M) of times. As illustrated, when decision 347 is answered in the negative, the OFS determines whether it has checked more than M different locations. See decision 351. So long as the OFS has not checked more than M locations in its effort to identify a location having enough units to fulfill the order line, the process loops back to 345. There, the OFS considers the location for the oldest units that were not previously considered.

In order to efficiently allocate orders, the system will not check more than M separate locations. In a specific embodiment, M is configurable, with a default value of 3. After M such checks, decision 351 is answered in the affirmative. At that point, the OFS identifies any pods that can collectively provide the remaining order items. See 353. This operation is analogous to operation 313 described in the context of FIG. 3A. After such pods have been identified, the process is complete.

Figure 4:
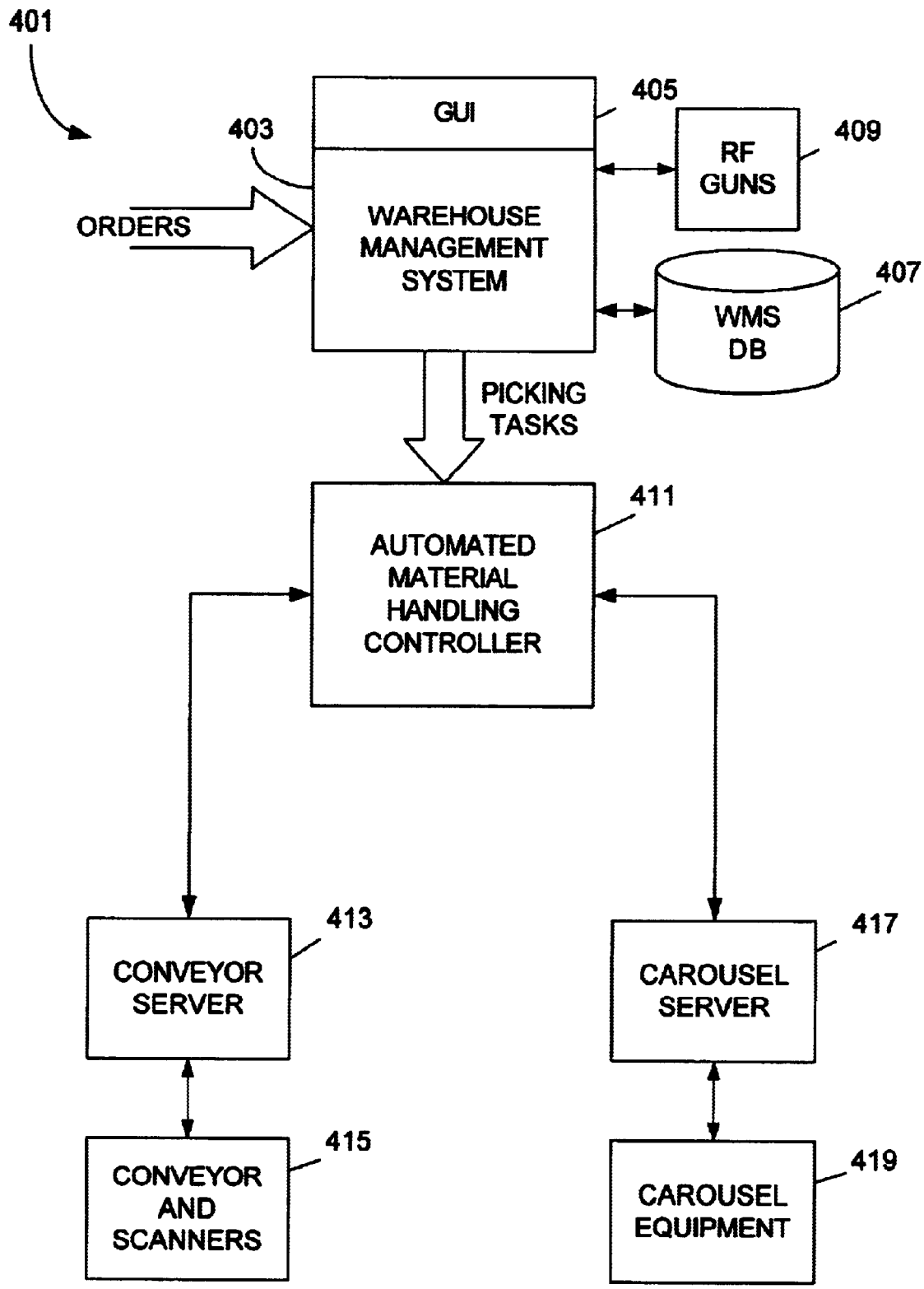
FIG. 4 is a block diagram of an Order Fulfillment Subsystem that may be employed in accordance with an embodiment of this invention.

As indicated, the distribution center—which may include a system of conveyers, carousels, scanners, and hand-held computing units for automating both the order fulfillment (outbound) and inventory restocking (inbound) processes—can be managed by the Order Fulfillment Subsystem. As shown in FIG. 4, an Order Fulfillment Subsystem 401 manages all functionality of the distribution center including a conveyor and associated scanners 415 and pods such as carousels 419. In general, OFS 401 includes appropriate hardware and/or software for managing the distribution facility. Such management hardware and/or software includes, for example, a warehouse management system (e.g. software application) 403 and an automated material handling (AMH) controller component 411, which manages the conveyor, carousel, and scanner components via a conveyor server 413 and a carousel server 417.

In a specific implementation, warehouse management system 403 may be configured with a set of business rules that set forth some or all functions of the present invention. In a very specific example, system 403 is a specially modified and adapted variation of the MOVE warehouse management system provided by Optum, Inc. of Costa Mesa, Calif.

Warehouse management system 403 has at least one database 407 associated therewith and at least a graphical user interface 405. Interface 405 allows certain warehouse personnel to access system 403 and query database 407, for example. It also allows such personnel to monitor distribution center operations and/or manually allocate orders.

Database 407 includes records for all inventory items stocked in the distribution center. In a specific embodiment, the database records may include at least a product ID, an inventory location, a quantity and a state. The state may specify the number of units of the product that are outbound (allocated), inbound (received at the distribution center but not yet putaway to its inventory location) or on hand. On hand items are all items currently physically located in the distribution center, outbound items are on hand items that have been allocated to an order but not yet picked. When an outbound item is picked, the on hand and outbound values for that item are decremented. In a preferred embodiment, database 407 provides inventory information that allows customers to place orders. To determine whether sufficient inventory is present to fill an order line, the system may consider the value of on hand units minus outbound units.

Warehouse management system 403 also communicates with handheld computing devices 409 via a wireless interface such as, for example, a radio frequency (RF) interface. The handheld computing devices 409 are used by the distribution center employees to perform and/or confirm inventory movement operations.

The warehouse system also provides an interface to other distribution system hardware/software, which allows it to receive customer orders for fulfilling. The order data, which is transferred to the OFS subsystem, may include both SKU data (as product IDs), quantities, customer information, and transportation/delivery data (e.g. delivery vehicle routes, stops, etc.). In a specific embodiment, the software interface is implemented using a business host interface (BHI). The interface may also allow other software/hardware components of the distribution center to communicate with the OFS database 407.

The warehouse management system 403 communicates instructions (e.g. task lists) to the automated material handling controller (AMH) 411. Importantly, system 403 outputs picking tasks which specify, for example, an inventory location, a quantity to pick, a container (tote), and an order line for a customer order. The AMH controller 411 processes the instructions and manages the conveyor server 413 and carousel server 417. The carousel server 417 and the conveyor server 413 may each include a respective database. The carousel server 417 issues control signals to the carousel client 419, which drives the carousel hardware and controls the carousel movement. Similarly, the conveyor server 413 processes instructions from the AMH, and issues control signals to the conveyor client 415, which drives and controls the conveyor scanner hardware used for routing inventory and for managing traffic. Additionally, the conveyor client 413 and the carousel client may be configured with an interface for monitoring the status of the conveyor and carousel hardware.

This invention is preferably implemented as software stored or transmitted on a machine-readable medium and executed on a processor. The invention may also be implemented on firmware provided with a processor for executing instructions specified by the firmware. In an alternative embodiment, the invention is implemented on specially designed or configured processing hardware.

Because program instructions and data may be employed to implement the systems/methods described herein, the present invention relates to machine-readable media that include program instructions, velocity data, etc. for performing various operations described herein (e.g., grouping inventory items based on their location on a velocity curve and logically distributing those items in put away regions of a distribution center). Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although certain preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A computer implemented method of filling a customer order in a distribution center having a plurality of pods, each of which has multiple inventory locations for stocking a plurality of items, the method comprising:
    choosing a pod to provide at least some of the items necessary to fulfill the customer order, where the pod is selected based upon a throughput analysis performed by a computer to identify the pod that contains, in comparison to other pods in the distribution center, the most items of the items in the customer order which have not yet been allocated to other pods;
    identifying a replicated item from the customer order, which replicated item is stocked at atleast two inventory locations in the pod, wherein the at least two inventory locations comprise a first inventory location having a first number of units of the replicated item and a second inventory location having a second number of units of the replicated item, and wherein the first number of units is greater than the second number of units; and
    choosing to fill the customer order with units of the replicated item stocked in the second inventory location.

2. The method of claim 1, wherein the throughput analysis analyzes at least one of the following parameters: a number of pods that a container must stop at when receiving items to fill the customer order, and balancing pick loads of various pods within the distribution center.

3. The method of claim 1, wherein the pod contains, in comparison to other pods in the distribution center, the most items of the customer order.

4. The method of claim 1, further comprising:
    identifying an expiry item from the customer order, which expiry item is replicated at an early storage location within the pod and a later storage location within the pod, wherein units of the expiry item in the early storage location expires sooner than units of the expiry item in the later storage location; and
    choosing to fill the customer order with expiry item units from the early storage location.

5. The method of claim 4, further comprising determining that the expiration point of the units in the early storage location is not earlier than a cutoff time, after which the units cannot be used to fulfill the customer order.

6. The method of claim 1, wherein the replicated item from the customer order that is stocked in the first and second inventory locations is an expiry item, and wherein units of the expiry item stocked in the first inventory location expire within an expiration window that covers expiration of units of the expiry item stocked in the second inventory location.

7. The method of claim 6, wherein the units in the first and second inventory locations expire on the same day.

8. The method of claim 1, wherein the distribution center has a plurality of ambience, each with its own collection of pods, and
    wherein the customer order is divided into at least a first group of items stocked in a first ambient and a second group of items stocked in a second ambient, and
    wherein the method of claim 1 is performed on the first group of items in the first ambient and the method of claim 1 is separate performed on the second group of items in the second ambient.

9. A computer readable medium on which is provided instructions for performing the method of claim 1.

10. A computer implemented method of filling a customer order in a distribution center having multiple inventory locations for stocking a plurality of items, the method comprising:
    using a computer to identify a replicated item from the customer order, which replicated item is stocked in at least a first inventory location and a second inventory location;
    determining that units of the replicated item in the first and second inventory locations expire within a single expiration window; and
    choosing to fill the customer order with units of the replicated item stocked in the second inventory location, wherein the first inventory location has a first number of units of the replicated item and the second inventory location has a second number of units of the replicated item, and wherein the first number is greater than the second number.

11. The method of claim 10, further comprising choosing to fill at least a portion of the customer order with items stocked in a pod of the distribution center, wherein the pod comprises the first and second inventory locations.

12. The method of claim 11, wherein the pod is chosen based upon throughput considerations.

13. The method of claim 10, wherein the single expiration window comprises between about one and three days.

14. The method of claim 10, further comprising moving one or more units of the replicated item in the second inventory location to a container that moves throughout the distribution center to hold items of the customer order.

15. A computer readable medium on which is provided instructions for performing the method of claim 10.

16. A distribution center having inventory arranged for filling customer orders, the distribution center comprising:
    at least one ambient having a plurality of pods, with each pod having multiple inventory locations for storing a plurality of items; and
    a computerized warehouse management system that performs a throughput analysis to select a pod to provide at least some of the items necessary to fill a customer order, wherein the pod contains, in comparison to other pods in the distribution center, the most items of the items in the customer order which have not yet been allocated to other pods and
    wherein the warehouse management system selects replicated items stocked in at least two inventory locations in the pod based upon which of the two inventory locations has the fewer units of the replicated item.

17. The distribution center of claim 16, comprising multiple ambients including at least a room temperature ambient and a refrigerated ambient.

18. The distribution center of claim 17, further comprising at least one of a humidor ambient and a freezer ambient.

19. The distribution center of claim 16, further comprising a transport system that moves a container from pod to pod and stops the container at pods where items are picked from the pod and placed in the container to fill the customer order.

20. Distribution center of claim 19, wherein the transport system is a conveyer.

21. The distribution center of claim 19, wherein the distribution center has two or more ambients, and wherein the warehouse management system divides the customer order between the multiple ambients, and wherein the distribution center has separate transport systems and containers for each ambient.

22. The distribution center of claim 16, wherein the warehouse management system comprises logic for identifying an expiry item from the customer order, which expiry item is replicated at an early storage location within the pod and a later storage location within the pod, wherein units of the expiry item in the early storage location expire earlier than units of the expiry item in the later storage location, and wherein the warehouse management system chooses to fill the customer order with expiry item units from the earlier storage location.

23. The distribution center of claim 20, wherein the warehouse management system determines whether expiry item units from the earlier storage location expire earlier than a cutoff time, after which units cannot be used to fill the customer order.

24. A warehouse management system that can allocate items from customer orders to specific pods within a distribution center, the pods each having multiple inventory locations for stocking a plurality of items, the warehouse management system comprising:

a database of inventory within the distribution center, said database specifying inventory locations where each of the items is stocked; and logic for (i) performing a throughout analysis to select at least a pod to provide at least some items necessary to fill a customer order, wherein the pod contains, in comparison to other pods in the distribution center, the most items of the items in the customer order which have not yet been allocated to other pods and (ii) choosing one of two or more in locations stocking a replicated item based upon which of the two or more inventory locations stocks the fewest number of units of the replicated item.

25. The warehouse management system of claim 24, wherein the throughput analysis analyzes at least one of the following parameters:

a number of pods that a container must stop at when receiving items to fill the customer order and balancing the pick loads of various pods within the distribution center.

26. The warehouse management system of claim 25, wherein the pod contains, in comparison to other pods in the distribution center, the most items of the customer order.

27. The warehouse management system of claim 24, wherein the logic also (i) identifies an expiry item from the customer order, which expiry item is replicated at an early storage location within the pod and a later storage location within the pod, wherein units of the expiry item in the early storage location expires sooner than units of the expiry item in the later storage location; and (ii) chooses to fill the customer order with expiry item units from the early storage location.

28. The warehouse management system of claim 27, wherein the logic also determines that the expiration point of the units in the early storage location is not earlier than a cutoff time, after which the units cannot be used to fulfill the customer order.

29. The warehouse management system of claim 24, wherein the replicated item from the customer order that is stocked in the two or more inventory locations is an expiry item, and wherein units of the expiry item stocked in the first inventory location expire within an expiration window that covers expiration of units of the expiry item stocked in the second inventory location.

30. The warehouse management system of claim 24, wherein the distribution center has a plurality of ambience, each with its own collection of pods, and wherein the warehouse management system divides the customer order into at least a first group of items stocked in a first ambient and a second group of items stocked in a second ambient.

* * * * *

UNITED STATES PATENT AND TRADEMARK OFFICE
CERTIFICATE OF CORRECTION

| | |
|---|---|
| PATENT NO. | : 6,622,127 B1 |
| APPLICATION NO. | : 09/568569 |
| DATED | : September 16, 2003 |
| INVENTOR(S) | : Klots et al. |

It is certified that error appears in the above-identified patent and that said Letters Patent is hereby corrected as shown below:

Claim 1,

Column 15, line 26 "item is stocked at atleast two" should be --item is stocked at at least two--

Signed and Sealed this

Twenty-first Day of April, 2009

JOHN DOLL
*Acting Director of the United States Patent and Trademark Office*